US009633009B2

(12) United States Patent
Alexe et al.

(10) Patent No.: US 9,633,009 B2
(45) Date of Patent: Apr. 25, 2017

(54) KNOWLEDGE-RICH AUTOMATIC TERM DISAMBIGUATION

(71) Applicant: International Business Machines Corporation, Armonk, NY (US)

(72) Inventors: Bogdan Alexe, San Jose, CA (US); Tyler Shore Baldwin, San Jose, CA (US); Yunyao Li, San Jose, CA (US); Ioana Roxana Stanoi, San Jose, CA (US); Shivakumar Vaithyanathan, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 13/956,663

(22) Filed: Aug. 1, 2013

(65) Prior Publication Data

US 2015/0039290 A1    Feb. 5, 2015

(51) Int. Cl.
*G06F 17/28* (2006.01)
*G06F 17/21* (2006.01)
*G06F 17/27* (2006.01)

(52) U.S. Cl.
CPC ........ *G06F 17/2795* (2013.01); *G06F 17/277* (2013.01)

(58) Field of Classification Search
CPC .. G06F 17/2795; G06F 17/277; G06F 17/274; G06F 17/271
USPC ............................................................. 704/9
See application file for complete search history.

(56) References Cited

U.S. PATENT DOCUMENTS

| | | | |
|---|---|---|---|
| 6,256,629 B1* | 7/2001 | Sproat ................ | G06F 17/2715 |
| 7,475,010 B2 | 1/2009 | Chao | |
| 7,899,666 B2 | 3/2011 | Varone | |
| 8,190,423 B2 | 5/2012 | Rehberg et al. | |
| 8,374,844 B2 | 2/2013 | Brun et al. | |
| 2002/0116174 A1* | 8/2002 | Lee ................... | G06F 17/30707 |
| | | | 704/9 |
| 2004/0133418 A1* | 7/2004 | Turcato et al. ................... | 704/9 |
| 2007/0106499 A1 | 5/2007 | Dahlgren et al. | |
| 2007/0233656 A1 | 10/2007 | Bunescu et al. | |
| 2007/0250650 A1* | 10/2007 | Fux ................................. | 710/67 |
| 2008/0195601 A1* | 8/2008 | Ntoulas et al. ................... | 707/5 |

(Continued)

FOREIGN PATENT DOCUMENTS

WO    2012057773    5/2012

OTHER PUBLICATIONS

Patwardhan et al, "Using WordNet-based Context Vectors to Estimate the Semantic Relatedness of Concepts," Proceedings of the EACL, 2006, pp. 1-8.*

(Continued)

*Primary Examiner* — Lamont Spooner
*Assistant Examiner* — Oluwadamilola M Ogunbiyi
(74) *Attorney, Agent, or Firm* — Fleit Gibbons Gutman Bongini Bianco PL; Thomas S. Grzesik

(57) ABSTRACT

Embodiments of the invention relate to ambiguity detection. In one embodiment, an object and a topical domain associated with the object are obtained. In this embodiment, the object includes at least one term. At least one of a plurality of information sources is analyzed based on the at least one term and the topical domain. A determination is made that object is one of ambiguous and unambiguous based on analyzing at least one of the plurality of information sources.

14 Claims, 6 Drawing Sheets

(56) References Cited

U.S. PATENT DOCUMENTS

2009/0144609 A1    6/2009  Liang et al.
2010/0293195 A1*  11/2010  Houghton .................... 707/776

OTHER PUBLICATIONS

Dagan et al, "Word Sense Disambiguation Using a Second Language Monolingual Corpus," Association of Computational Linguistics, 1994, vol. 20, No. 4, pp. 563-596.*
Gleich et al "Ambiguity Detection: Towards a Tool Explaining Ambiguity Sources", Requirements Engineering: Foundation for Software Quality. Springer Berlin Heidelberg, 2010, pp. 218-232.*
Schmitz, Sylvain, "An experimental ambiguity detection tool" Science of Computer Programming 75.1 (2010): 71-84.*
Luo, J. et al., "Concept-based Document Models using Explicit Semantic Analysis," 2012 IEEE International Conference on Granular Computing, Aug. 2012, pp. 338-342. Wuhan, Hubei, China.
Zavitsanos, E. et al., "Scalable Semantic Annotation of Text Using Lexical and Web Resources," Proc. 6th Hellenic Conference on AI Artificial Intelligence: Theories, Models and Applications, May 2010, pp. 1-10.
Auer, S., et al., "DBpedia: A Nucleus for a Web of Open Data", 6th International Semantic Web Conference, 2nd Asian Semantic Web Conference, Nov. 2007, pp. 722-735, Berlin, Heidelberg, Springer-Verlag.
Blei, D., et al., "Latent Dirichlet Allocation", Journal of Machine Learning Research, Jan. 2003, pp. 993-1022, vol. 3, Copyright 2003 David M. Blei, Andrew Y. NG, and Michael I. Jordan.
Brody, S., et al., "Bayesian Word Sense Induction", Proceedings of the 12th Conference of the European Chapter of the ACL, Mar. 30-Apr. 3, 2009, pp. 103-111, Copyright 2009 Association for Computational Linguistics. Athens, Greece.
Carpuat, M., et al., "Improving Statistical Machine Translation Using Word Sense Disambiguation", Proceedings of the 2007 Joint Conference on Empirical Methods in Natural Language Processing and Computational Natural Language Learning, Jun. 2007, pp. 61-72, Copyright 2007 Association for Computational Linguistics. Prague.
Chan, Y.S., et al., "Word Sense Disambiguation Improves Statistical Machine Translation", Proceedings of the 45th Annual Meeting of the Association of Computational Linguistics, Jun. 2007, pp. 33-40. Prague.
Chen, J., et al., "Chinese Verb Sense Discrimination Using an EM Clustering Model with Rich Linguistic Features", Proceedings of the 42nd Annual Meeting on Association for Computational Linguistics, Jul. 2004, pp. 1-8.
Klapaftis, I., "Word Sense Induction & Disambiguation Using Hierarchical Random Graphs", Proceedings of the 2010 Conference on Empirical Methods in Natural Language Processing, Oct. 9-11, 2010, pp. 745-755, Copyright 2010 Association for Computational Linguistics.
Lau, J.H., et al., "Word Sense Induction for Novel Sense Detection", Proceedings of the 13th Conference of the European Chapter of the Association for Computational Linguistics, Apr. 2012, pp. 591-601.
Nadeau, D., et al., "A survey of named entity recognition and classification", Linguisticae Investigationes, Jan. 2007, vol. 30, Issue 1, pp. 3-26, John Benjamins Publishing Company.
Navigli, R., et al., "Inducing Word Senses to Improve Web Search Result Clustering", Proceedings of the 2010 Conference on Empirical Methods in Natural Language Processing, Oct. 9-11, 2010, pp. 116-126, Copyright 2010 Association for Computational Linguistics.
Navigli, R., "Word Sense Disambiguation: A Survey". ACM Computing Surveys, Feb. 2009, vol. 41, No. 2, Article 10, pp. 1-68. Copyright 2009 ACM.
Pantel, P., et al., "Discovering Word Senses from Text". Proceedings of the eighth ACM SIGKDD international conference on Knowledge discovery and data mining, Jul. 2002, pp. 613-619. New York, NY.
Van De Cruys, T., "Using Three Way Data for Word Sense Discrimination", Proceedings of the 22nd International Conference on Computational Linguistics, Aug. 2008, pp. 929-936.
Wang, Y., et al., "Query Ambiguity Revisited: Clickthrough Measures for Distinguishing Informational and Ambiguous Queries", Proceedings of Human Language Technologies: The 2010 Annual Conference of the North American Chapter of the Association for Computational Linguistics, Jun. 2010, pp. 361-364.
Zhong, Z., et al., "Word Sense Disambiguation Improves Informational Retrieval", Proceedings of the 50th Annual Meeting for Association for Computational Linguistics, Jul. 8-14, 2012, pp. 273-282, Copyright 2012 Association for Computational Linguistics. Jeju Island, Korea.
Rao, D., et al., "Streaming Cross Document Entity Coreference Resolution", Proceedings of the 23rd International Conference on Computational Linguistics, Aug. 2010, pp. 1050-1058. Beijing.
Lee, H., et al., "Joint Entity and Event Coreference Resolution across Documents", Proceedings of the 2012 Joint Conference on Empirical Methods in Natural Language Processing and Computational Natural Language Learning, Jul. 12-14, 2012, pp. 489-500. Jeju Island, Korea.
Shu, L., et al., "A Latent Topic Model for Complete Entity Resolution", Proceedings of the 2009 IEEE International Conference on Data Engineering, Mar. 29-Apr. 2, 2009, pp. 880-891.
Manandhar, S., et al., "SemEval-2010 Task 14: Word Sense Induction & Disambiguation", Proceedings of the 5th International Workshop on Semantic Evaluation, Jul. 15-16, 2010, pp. 63-68, Copyright 2010 Association for Computational Linguistics.

\* cited by examiner

KNOWLEDGE-RICH AUTOMATIC TERM DISAMBIGUATION

BACKGROUND

Embodiments of the present invention generally relate to natural language processing, and more particularly relates to term disambiguation.

Many words, phrases, and referring expressions are semantically ambiguous. This ambiguity can be problematic for natural language processing applications and information extraction (IE) processes.

BRIEF SUMMARY

In one embodiment a method is disclosed. The method comprises obtaining an object and a topical domain associated with the object. The object comprises at least one term. At least one of a plurality of information sources is analyzed based on the at least one term and the topical domain. A determination is made that object is one of ambiguous and unambiguous based on analyzing at least one of the plurality of information sources.

In another embodiment, an information processing system is disclosed. The information processing system comprises a memory and a processor that is communicatively coupled to the memory. An ambiguity detector is communicatively coupled to the memory and the processor. The ambiguity detector is configured to perform a method. The method comprises obtaining an object and a topical domain associated with the object. The object comprises at least one term. At least one of a plurality of information sources is analyzed based on the at least one term and the topical domain. A determination is made that object is one of ambiguous and unambiguous based on analyzing at least one of the plurality of information sources.

In a further embodiment, a computer program product is disclosed. The computer program product comprises a non-transitory computer readable storage medium having computer readable program code embodied therewith. The computer readable program code is configured to perform a method. The method comprises obtaining an object and a topical domain associated with the object. The object comprises at least one term. At least one of a plurality of information sources is analyzed based on the at least one term and the topical domain. A determination is made that object is one of ambiguous and unambiguous based on analyzing at least one of the plurality of information sources.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
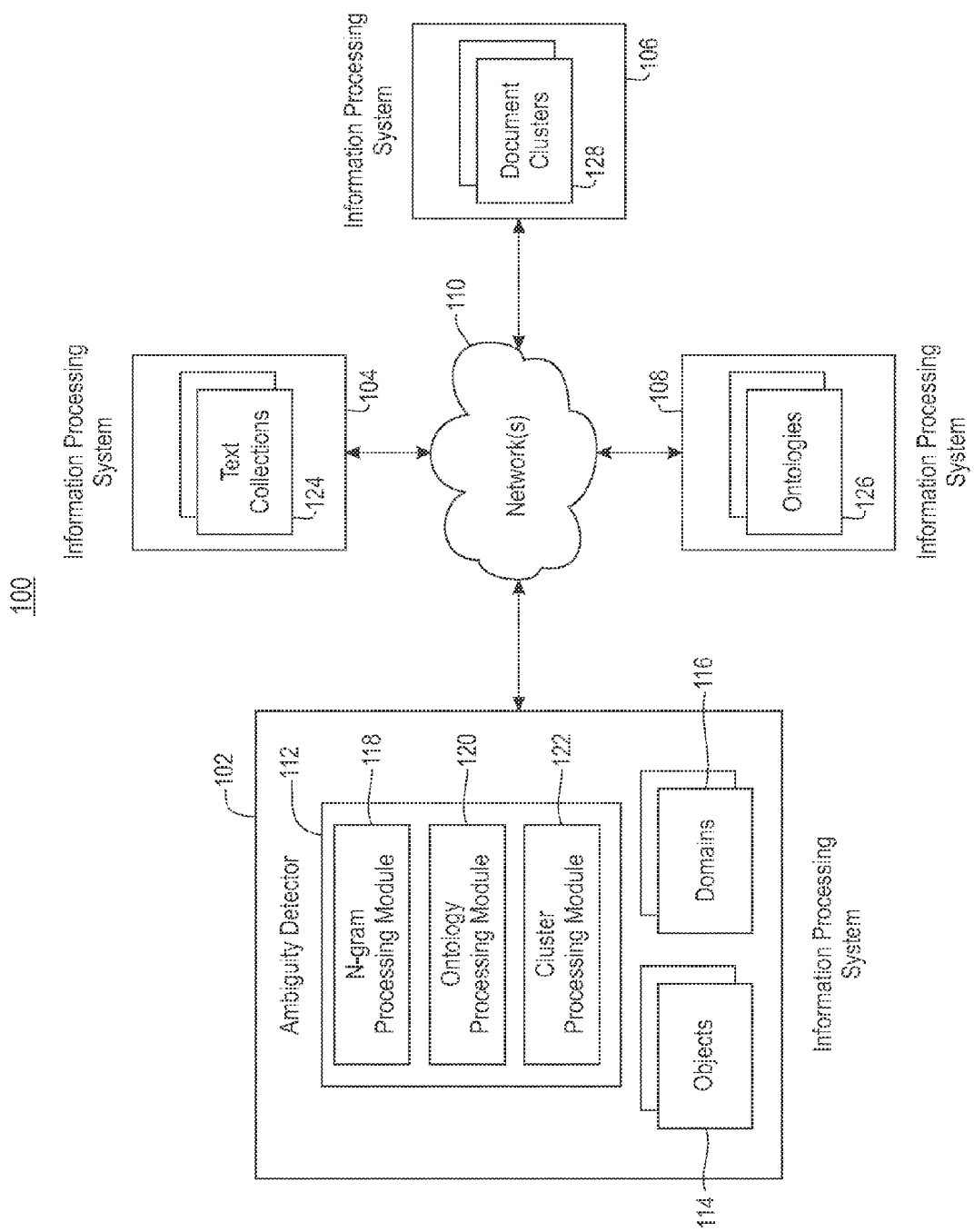
FIG. 1 is a block diagram illustrating one example of an operating environment according to one embodiment of the present invention.

FIG. 1 shows one example of an operating environment 100 for detecting object ambiguity according to various embodiments of the present invention. In this example, the operating environment 100 comprises a plurality of information processing systems 102, 104, 106, 108 each of which is communicatively coupled to one or more networks 110. At least one of the information processing systems 102 comprises an ambiguity detector 112. The ambiguity detector 112 can be implemented as a standalone component or can be implemented within one or more systems such as, but not limited to, an information extraction (IE) system. As will be discussed in greater detail below, the ambiguity detector 112 takes as input a given object(s) 114 and a domain(s) 116. It should be noted that throughout this discussion "object 114" is also referred to as a "term 114" and "domain 116" is also referred to as "topic 116". The objects 114 and domain 116, in one embodiment, can be provided to the ambiguity detector 112 directly by a user and/or obtained from one or more sources. For example, the ambiguity detector 112 can extract objects/terms 114 and their domains/topics 116 from one or more files, websites, and/or the like.

Based on the received input, the ambiguity detector 112 determines whether the given term(s) 114 is semantically ambiguous. In one embodiment, a semantically "ambiguous" term refers to a term, where given a surface form of the term and a type of the term, the term is considered semantically ambiguous if the term corresponds to a concept other than its type. For example, if the given term is "World Cup" and its type/domain is "Football Event" then the ambiguity detector 112 determines that "World Cup" is ambiguous since "World Cup" can refer to other events. A term can be ambiguous in many ways. For example, a term can have non-referential senses in which it shares a name with a common word or phrase. A term may have referential senses across topical domains such as a film and a book. Terms may also be ambiguous within a topical domain. For instance, some video game titles may refer to a video game franchise or one of several individual games within the franchise.

In one embodiment, the ambiguity detector 112 comprises a plurality of processing modules such as an n-gram processing module 118, an ontology processing module 120, and a cluster processing module 122. As will be discussed in greater detail below, each of these processing modules 118, 120, 122 processes an input term (which can comprise one or more words) and domain against a set of data such as information sources 124, 126, 128, and predicts whether the term is ambiguous or unambiguous based thereon. The n-gram processing module 118 processes the term against n-gram data from one or more text collections 124 such as, but not limited to, one or more text corpora. The ontology processing module 120 processes the term against one or more ontologies 126 such as, but not limited to, dictionaries and disambiguation sources (e.g., a wiki disambiguation page(s)). The cluster processing module 122 processes the term against a one or more domain clusters 128.

It should be noted that although FIG. 1 shows the text collections 124, ontologies 126, and domain clusters 128 residing on different information processing systems 104, 106, 108 two of more of these items can reside on a single information processing system. In addition, the information processing system 102 comprising the ambiguity detector 122 can also include one or more of the text collections 124, ontologies 126, and/or domain clusters 128. It should also be noted that embodiments of the present invention are not limited to the number of processing modules shown in FIG. 1 and discussed herein.

The ambiguity detector 122 labels a term 114 as ambiguous or unambiguous based on the output of the processing modules 118, 120, 122. For example, the ambiguity detector 112 labels the term 114 as ambiguous if any of the processing modules 118, 120, 122 predicts that the term 114 is ambiguous. The ambiguity detector 112 labels the term as unambiguous if at least two or more of the processing modules 118, 120, 122 determine/predict that the term 114 is unambiguous. In one embodiment, the processing modules 118, 120, 122 are pipelined such that the processing modules 118, 120, 122 process the term 114 in a sequential manner. For example, after a first of the processing modules 118, 120, 122 processes the input term 114 and domain 116 they are is passed to the next processing module in the pipeline. This process is repeated until all processing modules 118, 120, 122 have processed the term. However, in some embodiments, processing of the term 114 completes when one of the processing modules predicts 118, 120, 122 that the term is ambiguous. In one embodiment, each ambiguity detection operation performed by a subsequent processing module increases the accuracy of a previous module's output. It should be noted that, in other embodiments, two or more of the processing modules 118, 120, 122 simultaneously process the term 114.

Figure 2:
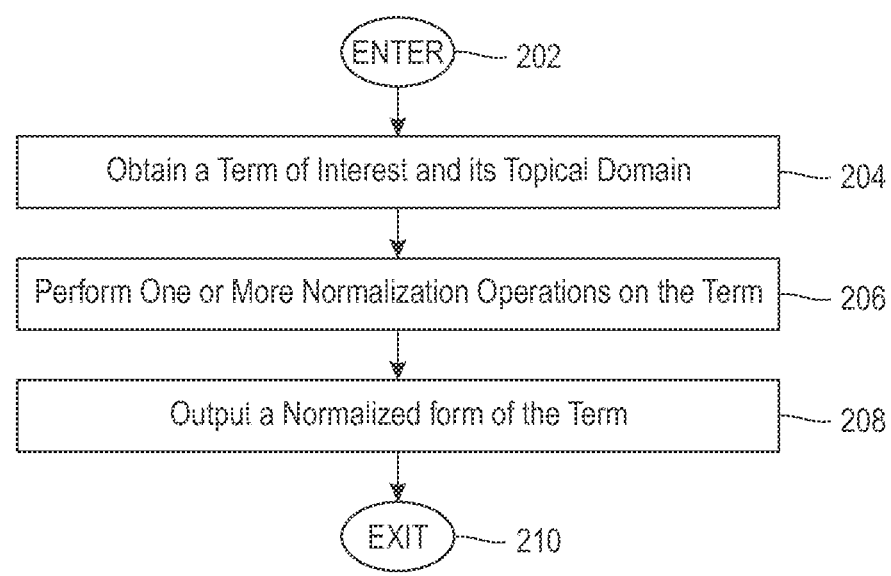
FIG. 2 is an operational flow diagram illustrating one example of a process for pre-processing an object for ambiguity detection according to one embodiment of the present invention.

In one embodiment, once the ambiguity detector 112 obtains a term 114 and a topic domain 116 the ambiguity detector 112 performs one or more optional pre-processing operations thereon. However, in other embodiments, the ambiguity detector 112 is not required to perform these pre-processing operations, or these operations can be of the operations performed by the processing modules 118, 120, 122. FIG. 2 shows an operational flow diagram illustrating one example of pre-processing a term 114. In the example shown in FIG. 2, the operational flow starts at step 202 and flows directly into step 204. As shown in FIG. 2, the ambiguity detector 112 obtains a term 114 of interest and its topical domain, at step 204. The ambiguity detector 112 then performs one or more normalization operations on the term 114, at step 206. For example, the ambiguity detector 12 changes capital letters in the term 114 to lower case and removes various stopwords. In one embodiment, the ambiguity detector 112 removes stopwords, such as (but not limited to) leading stopwords, by comparing the term 114 to a dictionary of stopwords. Any words in the term 114 matching a word within the stopword dictionary are removed. After the normalization operation(s) have been performed, the ambiguity detector 112 outputs a normalized term, at step 208. The control flow then exits at step 210.

Figure 3:
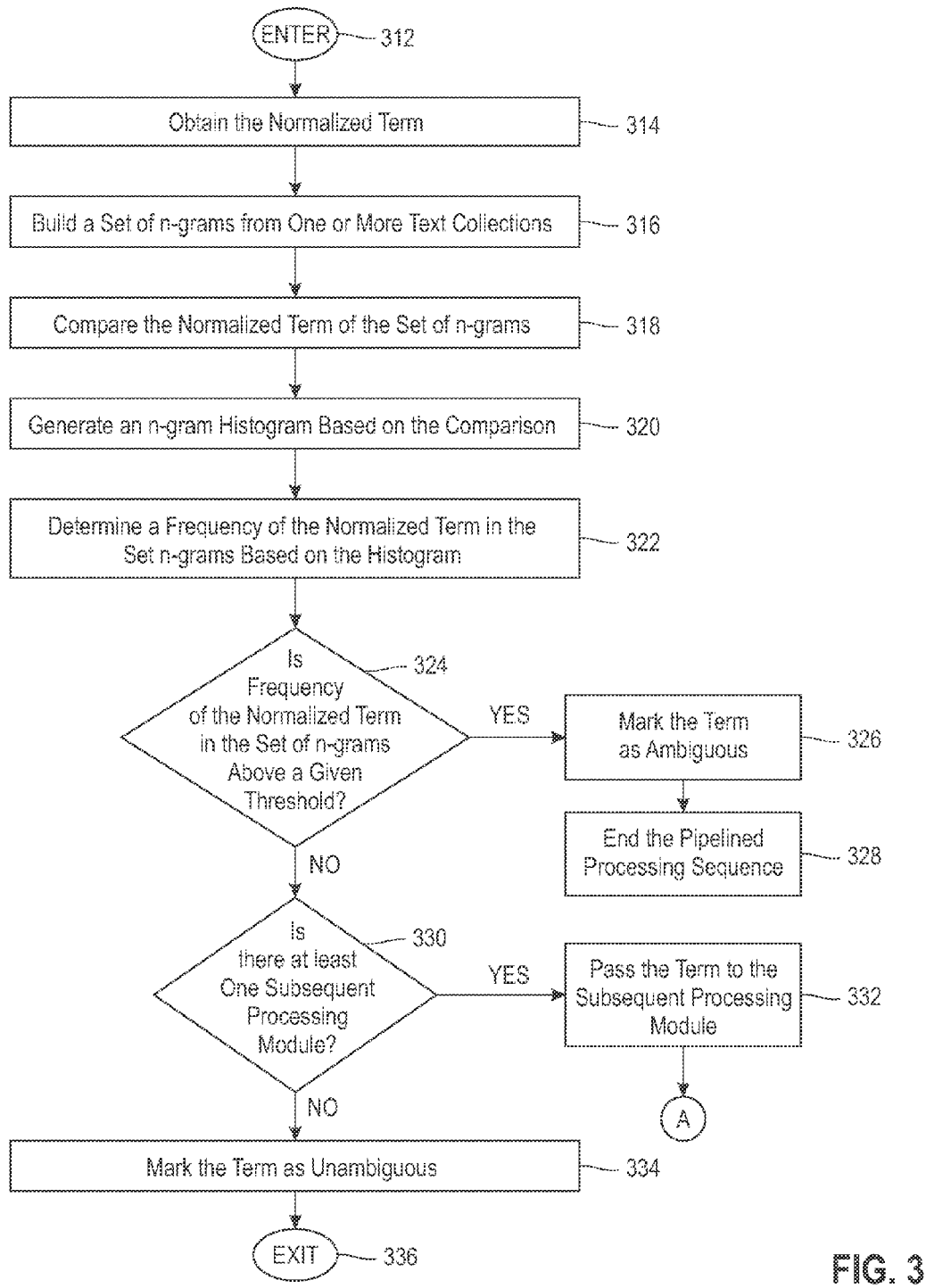
FIG. 3 is an operational flow diagram illustrating one example of a process for detecting ambiguity of an object based on n-grams according to one embodiment of the present invention.
Figure 4:
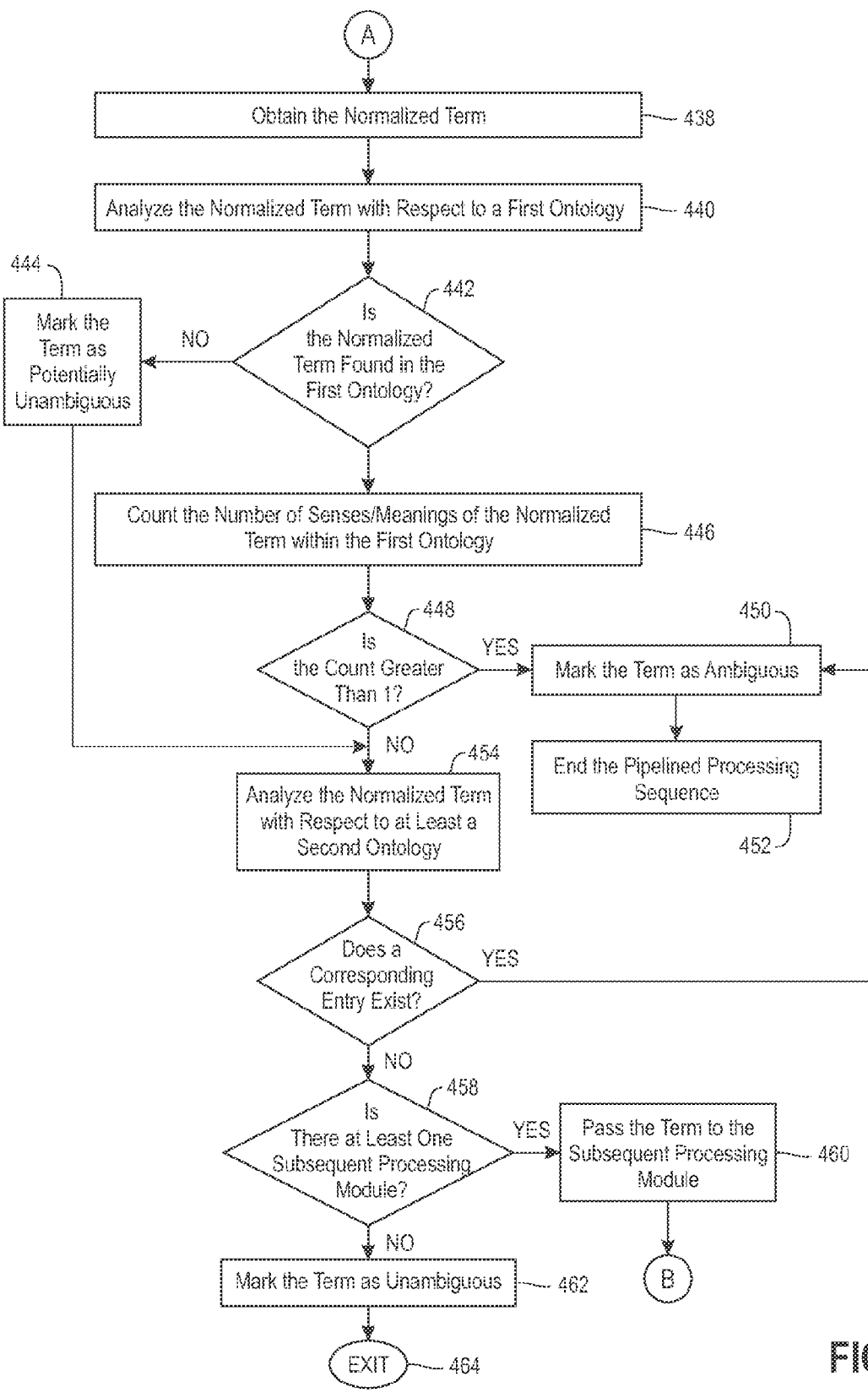
FIG. 4 is an operational flow diagram illustrating one example of a process for detecting ambiguity of an object based on ontologies according to one embodiment of the present invention.
Figure 5:
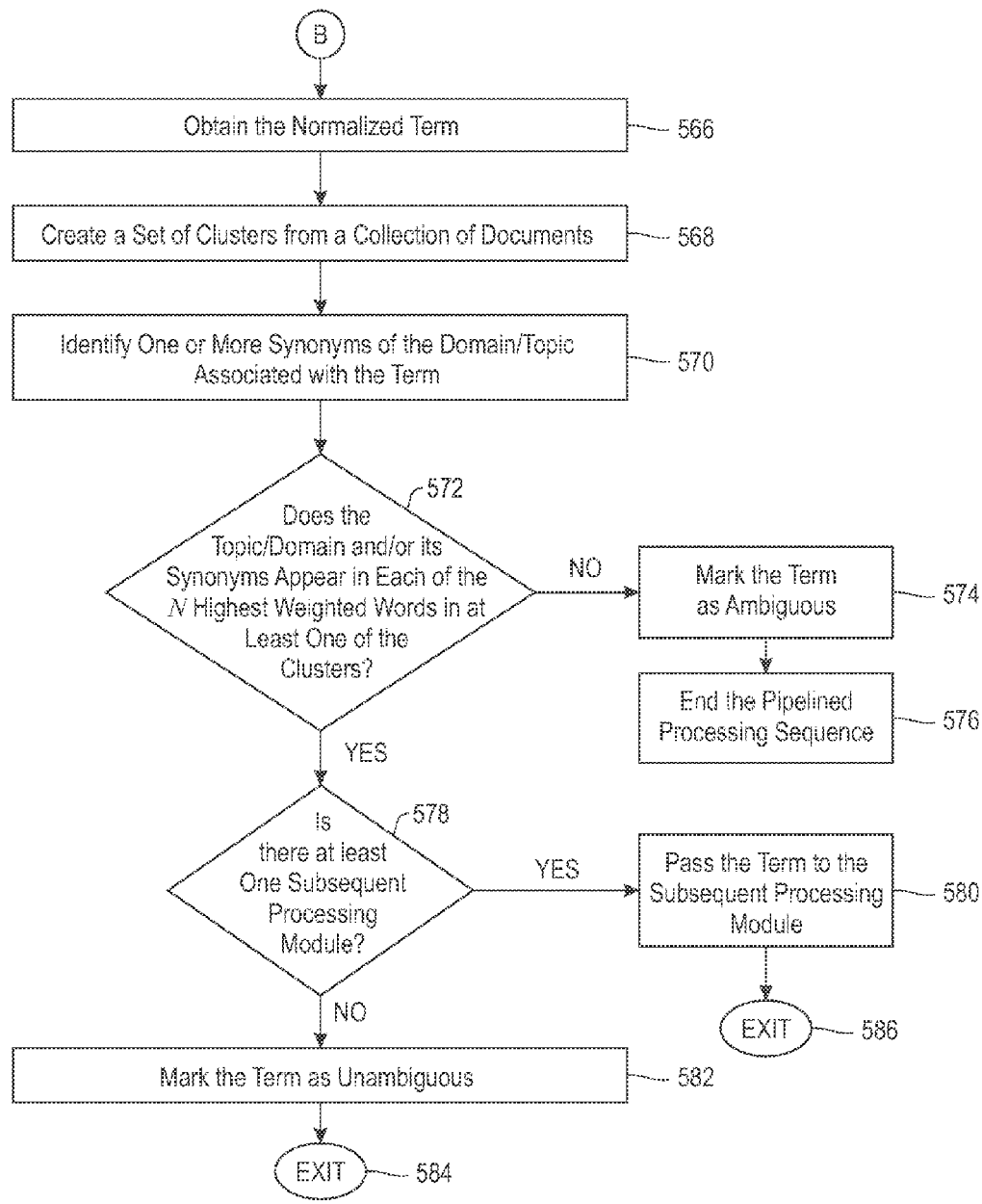
FIG. 5 is an operational flow diagram illustrating one example of a process for detecting ambiguity of an object based on document clusters according to one embodiment of the present invention.

The normalized term (or original term 1114) is then processed by the ambiguity detector 112 to determine whether the term 114 is ambiguous or unambiguous. FIGS. 3-5 show operational flow diagrams illustrating one example of performing ambiguity detection operations on a term in a pipelined manner. In the example shown in FIG. 3, the operational flow starts at step 312 and flows directly into step 314. The n-gram processing module 118 obtains the normalized term (or original term 114), at step 314. The n-gram processing module 118 builds a set of n-grams from one or more text collections 124, at step 316. An n-gram, in this embodiment, is a contiguous sequence of n items from a sequence of text (or speech). The n items can include, but are not limited to, words, base pairs, letters, syllables, phonemes, etc. In one embodiment, n-grams are created by tokenizing a large corpus of written text such as (but not limited to) newspaper articles. The n-gram processing module 118 builds then observes each run of N (for N=2, 3, 4, . . . ) contiguous words.

The n-gram processing module 118 compares the term to the set of n-grams generated from the one or more text collections 124, at step 318. Based on this comparison, the n-gram processing module 118 generates an n-gram histogram that models the frequency distribution of the term with respect to the set of n-grams, at step 320. In on embodiment, the n-gram histogram is created by counting the total number of times a given run of n words appear in the entire collection. An n-gram is identified frequent if the frequency of this n-gram is higher than X % of n-grams. An n-gram is identified as highly frequent if the frequency of this n-gram is higher than Y % of n-grams, where Y>X. It should be noted that, in some embodiments, the n-gram processing module 118 removes the least common n-grams from consideration. This allows the ambiguity detector 112 to avoid making judgments of ambiguity based on very infrequent uses of the normalized term.

The n-gram processing module 118 determines how frequently (e.g., the number of times) the normalized term appears in the set of n-grams based on the generated histogram, at step 322. The n-gram processing module 118 determines if the frequency of the normalized term is above a given threshold, at step 324. If so, the n-gram processing module 118 marks the term as ambiguous, at step 326. For example, the n-gram processing module 118 stores an indication that the term is ambiguous and optionally notifies a user. The ambiguity detector 112 ends the pipelined processing sequence, at step 328. The control flow then exits. If the frequency of the normalized term is below the given threshold, the n-gram processing module 118 determines if there is at least one subsequent processing module remaining in the pipelined processing sequence, at step 330. If so, the normalized term is marked as potentially unambiguous and passed to the next processing module, at step 332. If not, the n-gram processing module 118 stores an indication that the term is unambiguous and optionally notifies a user, at step 334. The control flow then exits at step 336.

In this example, the ontology processing module 120 is the next processing module in the pipelined processing sequence and obtains the normalized term, at step 438. The ontology processing module 120 analyzes the normalized term with respect to one or more ontologies 126 to detect across domain ambiguity. In this embodiment, the ontology processing module 120 analyzes a first ontology such as a dictionary-based ontology to determine if the term has multiple senses/meanings, at step 440. Based on this analysis the ontology processing module 120 determines if the term was found within the dictionary-based ontology, at step 442. If the term is not found within the dictionary-based ontology, the ontology processing module 120 marks the term as potentially unambiguous, at step 444. The control then flows to step 454.

If the term is found within the ontology, the ontology processing module 120 counts the number of senses/meanings of the term within the ontology, at step 446. The ontology processing module 120 determines if the count is greater than 1, at step 448. If the number of senses/meanings is greater than 1 (i.e., the term has multiple sense/meanings) the ontology processing module 120 marks the term is ambiguous, at step 450. For example, the ontology processing module 120 stores an indication that the term is ambiguous and optionally notifies a user. The ontology processing module 120 ends the pipelined processing sequence, at step 452. The control flow then exits.

If the number of senses/meanings is equal to 1 the ontology processing module 120 analyzes at least a second ontology that is of a different type than the first ontology, at step 454. For example, the ontology processing module 120 analyzes a disambiguation-based ontology to determine if the normalized term is associated with a disambiguation section/entry. A disambiguation section/entry, in this example, is a section/entry of an ontology that lists the various topics/domains referred to by a single term (which can comprise one or more words). The ontology processing module 120 determines if the normalized term is associated with a disambiguation section/entry of the second ontology, at step 456. If so, the control flows to step 450. For example, the n-gram processing module 112 stores an indication that the term is ambiguous and optionally notifies a user. The ambiguity detector 112 ends the pipelined processing sequence and the control flow then exits.

If the normalized term is not associated with a disambiguation section, the ontology processing module 120 determines if there is at least one subsequent processing module remaining in the pipelined processing sequence, at step 458. If so, the normalized term is marked as potentially unambiguous and passed to the next processing module, at step 460. If not, the ontology processing module 120 stores an indication that the term is unambiguous and optionally notifies a user, at step 462. The control flow then exits at step 464. It should be noted that in the example given above the ontology processing module 120 is not limited to analyzing the dictionary-based ontology prior to the disambiguation-based ontology.

In this non-limiting example, the cluster processing module 122 is the next processing module in the pipelined processing sequence and obtains the normalized term, at step 566. The cluster processing module 122, in one embodiment, detects both non-referential and across domain ambiguity. The cluster processing 116 clusters a collection of documents, where a document is an occurrence of text that comprises the term, at step 568. One example of a clustering process is provided in Blei, David M.; Ng, Andrew Y.; Jordan, Michael I (January 2003): "Latent Dirichlet allocation"; In Lafferty, John. *Journal of Machine Learning Research* 3 (4-5) pp. 993-1022, which is hereby incorporated by reference in its entirety.

In one embodiment, the cluster processing module 122 utilizes one or more topic modeling methods such as, but not limited to, Latent Dirichlet Allocation (LDA), for clustering the collection of documents in which the term appears. In this embodiment, a document is represented as a distribution of topics and each topic is represented as a distribution of words. For example, a domain can be (but not limited to) social network messages where social network messages that contain the term of interest can be a document collection. It should be noted that the domain in this embodiment can be (but is not required to be) the same as the domain entered as an input. Given the document collection, the cluster processing module 122 utilizes LDA to model each document d as a finite mixture over an underlying set of topics, where each topic t is characterized as a distribution over words. A posterior Dirichlet parameter can be associated with the document d and the topic t to indicate the strength of t in d. The output of the clustering process is a set of clusters comprising a plurality of words. Each word in the set of words is associated with a weight.

The cluster processing module 122 identifies one or more synonyms of the domain/topic, at step 570. The cluster processing module 122 analyzes each cluster to determine if the topic/domain or any of its synonyms appear in each of the N highest weighted words in at least one of the clusters, at 572. If the topic/domain or any of its synonyms fail to appear in each of the N highest weighted words in at least one of the clusters, the cluster processing module 122 marks the term as ambiguous, at step 574. For example, the cluster processing module 122 stores an indication that the term is ambiguous and optionally notifies a user. The cluster processing module 122 ends the pipelined processing sequence, at step 576. The control flow then exits. If the topic/domain or any of its synonyms appear in each of the N highest weighted words in at least one of the clusters, the cluster processing module 122 determines if there is at least one subsequent processing module remaining in the pipelined processing sequence, at step 578. If so, the normalized term is marked as potentially unambiguous and passed to the next processing module, at step 580. The control flow then exits at step 586. If not, the cluster processing module 122 stores an indication that the term is unambiguous and optionally notifies a user, at step 582. The control flow then exits at step 584.

Accordingly, one or more embodiments provide an ambiguity detection framework that determines whether a term is ambiguous relative to a topical domain. Unlike other ambiguity resolution tasks, one or more embodiments make general ambiguity judgments about terms, rather than resolving individual instances. For example, given a term and a corresponding topic domain, one or more embodiments determine whether the term uniquely references a member of that topic domain. This eliminates the need for ambiguity resolution on unambiguous objects, which allows for increased throughput of information extraction systems on large data sets.

Figure 6:
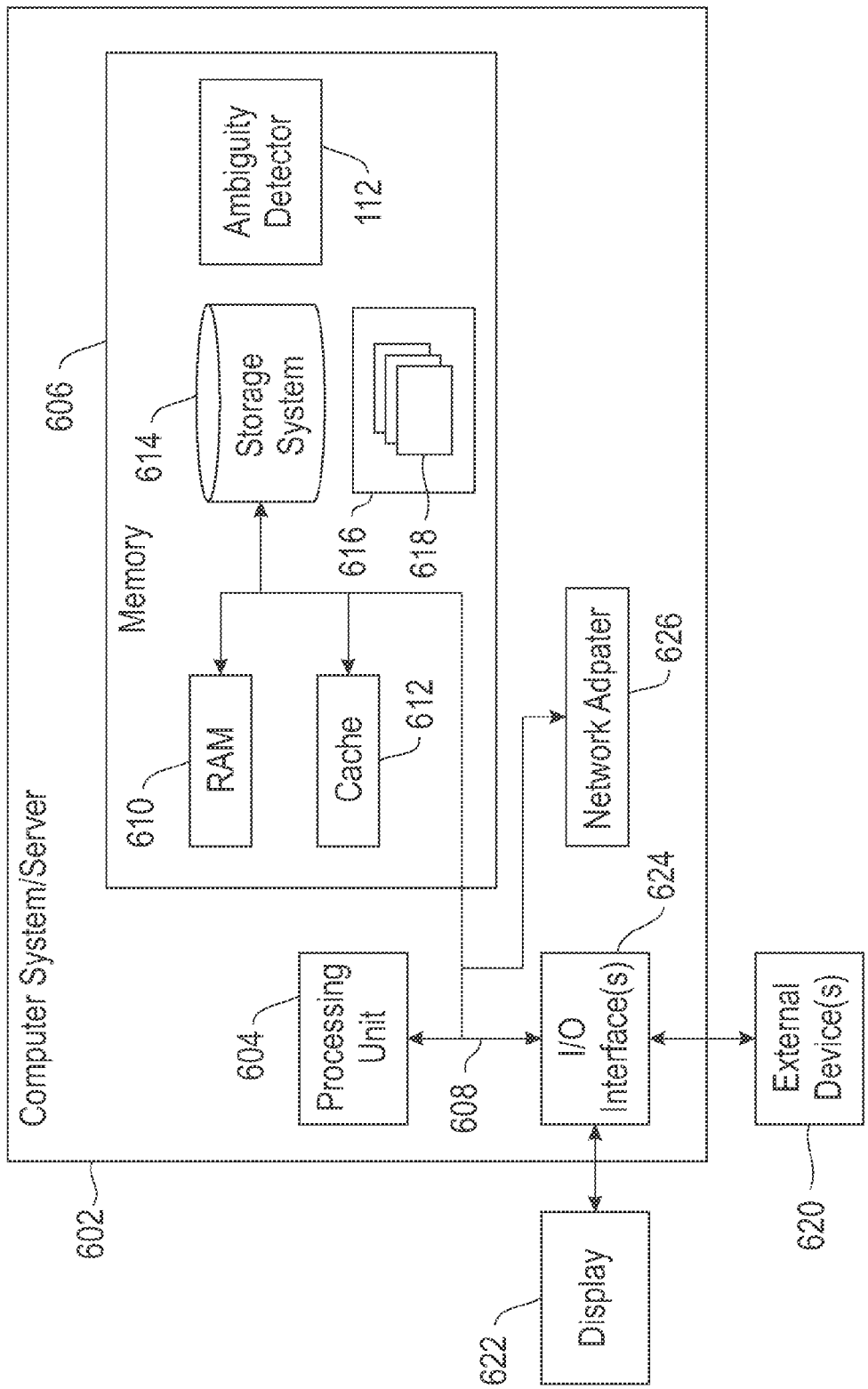
FIG. 6 is a block diagram illustrating an information processing system that can be utilized in embodiments of the present invention.

FIG. 6 shows one example of an information processing system 602 that can be utilized in embodiments of the present invention. The information processing system 602 shown in FIG. 6 is only one example of a suitable system and is not intended to limit the scope of use or functionality of embodiments of the present invention described above. Any suitably configured processing system such as desktop computers, laptop computers, servers, wireless devices (e.g., mobile phones, tablets, personal digital assistants, etc.), and the like can be used as the information processing system 602 in embodiments of the present invention.

As illustrated in FIG. 6, the information processing system 602 is in the form of a general-purpose computing device. The components of the information processing system 602 can include, but are not limited to, one or more processors or processing units 604, a system memory 606, and a bus 608 that couples various system components including the system memory 606 to the processor 604.

The bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 606, in one embodiment, comprises the ambiguity detector 112 discussed above. It should be noted that even though FIG. 6 shows the ambiguity detector 112 residing in the main memory, the ambiguity detector 112 can reside within the processor 604 to be a separate hardware component. The system memory 606 can include computer system readable media in the form of volatile memory, such as random access memory (RAM) 610 and/or cache memory 612. The information processing system 602 can further include other removable/non-removable, volatile/non-volatile computer system storage media. By way of example only, a storage system 614 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 608 by one or more data media interfaces. The memory 606 can include at least one program product having a set of program modules that are configured to carry out the functions of an embodiment of the present invention.

Program/utility 616, having a set of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of embodiments of the present invention.

The information processing system 602 can also communicate with one or more external devices 620 such as a keyboard, a pointing device, a display 622, etc.; one or more devices that enable a user to interact with the information processing system 602; and/or any devices (e.g., network card, modem, etc.) that enable computer system/server 602 to communicate with one or more other computing devices. Such communication can occur via I/O interfaces 624. Still yet, the information processing system 602 can communicate with one or more networks such as a local area network (LAN), a general wide area network (WAN), and/or a public network (e.g., the Internet) via network adapter 626. As depicted, the network adapter 626 communicates with the other components of information processing system 602 via the bus 608. Other hardware and/or software components can also be used in conjunction with the information processing system 102. Examples include, but are not limited to: microcode, device drivers, redundant processing units, external disk drive arrays, RAID systems, tape drives, and data archival storage systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A method by an information processing system, the method comprising:
   electronically communicating with at least one external information processing system;
   obtaining, based on electronically communicating with the at least one external information processing system, an object and a topical domain associated with the object from the at least one external information processing system, wherein the object comprises at least one term; and
   for at least one information source in a plurality of information sources coupled together in a pipelined sequence, electronically processing the object as follows
      analyzing the information source based on the at least one term and the topical domain;
      determining, based on the analysing, if the object is one of ambiguous and unambiguous;
      in response to determining that the object is ambiguous, further determining that all instances of the object are ambiguous based on the object being ambiguous, and halting the analysis of any subsequent information source in the plurality of information sources, and outputting an indication to a display coupled to an information processing system that the object is ambiguous; and
      in response to determining that the object fails to be ambiguous, determining if a subsequent information source exists in the plurality of information sources;
         in response to determining that a subsequent information source exists, passing the processing of the object to the subsequent information source; and
         in response to determining that a subsequent information source fails to exist, outputting an indication to the display that all instances of the object are unambiguous.

2. The method of claim 1, wherein analyzing the at least one information source comprises:
   analyzing, based on the at least one term and the topical domain, a set of n-grams generated from at least one text corpus;
   generating, based on the analyzing, a count of a number of times the at least one term appears in the text corpus;
   determining if the count is greater than a threshold,
   wherein determining if the object is one of ambiguous and unambiguous further comprises
      storing the indication that the object is ambiguous in response to determining that the count is greater than the threshold, and
      storing the indication that the object is unambiguous in response to determining that the count is less than the threshold.

3. The method of claim 1, wherein analyzing the at least one information source comprises:
   analyzing, based on the at least one term and the topical domain, a set of ontologies; and
   determining, based on the analyzing the set of ontologies, if the object comprises multiple senses within at least one of the set of ontologies,
   wherein determining if the object is one of ambiguous and unambiguous further comprises storing the indication that the object is ambiguous in response to determining that the object comprises multiple senses within the at least one of the set of ontologies, and storing the indication that the object is unambiguous in response to determining that the object fails to comprise multiple senses within the at least one of the set of ontologies.

4. The method of claim 1, wherein analyzing the at least one information source comprises:

analyzing, based on the at least one term and the topical domain, a set of document clusters, wherein each document comprises a set of words associated with the at least one term, and wherein each of the set of words is associated with a weight;

determining, based on analyzing the set of document clusters, if at least one of the domain and one or more synonyms of the domain appear in N highest weighted words in at least one of the set of document clusters, wherein determining if the object is one of ambiguous and unambiguous further comprises storing an indication that the object is ambiguous in response to determining that at least one of the domain and one or more synonyms of the domain fails to appears in the N highest weighted words in at least one of the set of document clusters, and storing the indication that the object is unambiguous in response to determining that at least one of the domain and one or more synonyms of the domain appears in the N highest weighted words in at least one of the set of document clusters.

5. The method of claim 1, wherein the plurality of information sources comprise at least one of:

a set of text corpora;
a set of ontologies; and
a set of clustered documents.

6. An information processing system comprising:

a memory;
a processor communicatively coupled to the memory; and
an ambiguity detector communicatively coupled to the memory and the processor, wherein the ambiguity detector is configured to perform a method comprising:
electronically communicating with at least one external information processing system;
obtaining, based on electronically communicating with the at least one external information processing system, an object and a topical domain associated with the object from the at least one external information processing system, wherein the object comprises at least one term; and
for at least one information source in a plurality of information sources coupled together in a pipelined sequence electronically processing the object as follows analyzing the information source based on the at least one term and the topical domain;
determining, based on the analyzing, if the object is one of ambiguous and unambiguous;
in response to determining that the object is ambiguous, further determining that all instances of the object are ambiguous based on the object being ambiguous, and halting the analysis of any subsequent information source in the plurality of information sources, and outputting an indication to a display coupled to an information processing system that the object is ambiguous; and in response to determining that the object fails to be ambiguous, determining if a subsequent information source exists in the plurality of information sources;
in response to determining that a subsequent information source exists, passing the processing of the object to the subsequent information source; and
in response to determining that a subsequent information source fails to exist, outputting an indication to the display that all instances of the object are unambiguous.

7. The information processing system of claim 6, wherein analyzing the at least one information source comprises:

analyzing, based on the at least one term and the topical domain, a set of n-grams generated from at least one text corpus;
generating, based on the analyzing, a count of a number of times the at least one term appears in the text corpus; and
determining if the count is greater than a threshold;
wherein determining if the object is one of ambiguous and unambiguous further comprises
storing the indication that the object is ambiguous in response to determining that the count is greater than the threshold, and
storing the indication that the object is unambiguous in response to determining that the count is less than the threshold.

8. The information processing system of claim 6, wherein analyzing the at least one information source comprises:

analyzing, based on the at least one term and the topical domain, a set of ontologies; and
determining, based on the analyzing the set of ontologies, if the object comprises multiple senses within at least one of the set of ontologies,
wherein determining if the object is one of ambiguous and unambiguous further comprises
storing the indication that the object is ambiguous in response to determining that the object comprises multiple senses within the at least one of the set of ontologies, and
storing the indication that the object is unambiguous in response to determining that the object fails to comprise multiple senses within the at least one of the set of ontologies.

9. The information processing system of claim 6, wherein analyzing the at least one information source comprises:

analyzing, based on the at least one term and the topical domain, a set of document clusters, wherein each document comprises a set of words associated with the at least one term, and wherein each of the set of words is associated with a weight; and
determining, based on analyzing the set of document clusters, if at least one of the domain and one or more synonyms of the domain appear in N highest weighted words in at least one of the set of document clusters,
wherein determining if the object is one of ambiguous and unambiguous further comprises
storing an indication that the object is ambiguous in response to determining that at least one of the domain and one or more synonyms of the domain fails to appear in the N highest weighted words in at least one of the set of document clusters, and
storing the indication that the object is unambiguous in response to determining that at least one of the domain and one or more synonyms of the domain appears in the N highest weighted words in at least one of the set of document clusters.

10. A computer program product comprising:
a non-transitory computer readable storage medium having computer readable program code embodied therewith, the computer readable program code configured to program a processing circuit to perform a method comprising:
electronically communicating with at least one external information processing system;
obtaining, based on electronically communicating with the at least one external information processing system, an object and a topical domain associated with the object from the at least one external information processing system, wherein the object comprises at least one term; and
for at least one information source in a plurality of information sources coupled together in a pipelined sequence electronically processing the object as follows
analyzing the information source based on the at least one term and the topical domain;
determining, based on the analyzing, if the object is one of ambiguous and unambiguous;
in response to determining that the object is ambiguous, further determining that all instances of the object are ambiguous based on the object being ambiguous, and halting the analysis of any subsequent information source in the plurality of information sources, and outputting an indication to a display coupled to an information processing system that the object is ambiguous; and
in response to determining that the object fails to be ambiguous, determining if a subsequent information source exists in the plurality of information sources;
in response to determining that a subsequent information source exists, passing the processing of the object to the subsequent information source; and
in response to determining that a subsequent information source fails to exist, outputting an indication to the display that all instances of the object are unambiguous.

11. The computer program product of claim 10, wherein analyzing the at least one information source comprises:
analyzing, based on the at least one term and the topical domain, a set of n-grams generated from at least one text corpus;
generating, based on the analyzing, a count of a number of times the at least one term appears in the text corpus; and
determining if the count is greater than a threshold, wherein determining if the object is one of ambiguous and unambiguous further comprises
storing the indication that the object is ambiguous in response to determining that the count is greater than the threshold, and
storing the indication that the object is unambiguous in response to determining that the count is less than the threshold.

12. The computer program product of claim 10, wherein analyzing the information source comprises:
analyzing, based on the at least one term and the topical domain, a set of ontologies; and
determining, based on the analyzing the set of ontologies, if the object comprises multiple senses within at least one of the set of ontologies,
wherein determining if the object is one of ambiguous and unambiguous further comprises
storing the indication that the object is ambiguous in response to determining that the object comprises multiple senses within the at least one of the set of ontologies, and
storing the indication that the object is unambiguous in response to determining that the object fails to comprise multiple senses within the at least one of the set of ontologies.

13. The computer program product of claim 10, wherein analyzing the at least one information source comprises:
analyzing, based on the at least one term and the topical domain, a set of document clusters, wherein each document comprises a set of words associated with the at least one term, and wherein each of the set of words is associated with a weight; and
determining, based on analyzing the set of document clusters, if at least one of the domain and one or more synonyms of the domain appear in N highest weighted words in at least one of the set of document clusters,
wherein determining, if the object is one of ambiguous and unambiguous further comprises
storing an indication that the object is ambiguous in response to determining that at least one of the domain and one or more synonyms of the domain fails to appear in the N highest weighted words in at least one of the set of document clusters, and
storing the indication that the object is unambiguous in response to determining that at least one of the domain and one or more synonyms of the domain appears in the N highest weighted words in at least one of the set of document clusters.

14. The computer program product of claim 10, wherein the plurality of information sources comprise at least one of:
a set of text corpora;
a set of ontologies; and
a set of clustered documents.

* * * * *